United States Patent [19]

Mori et al.

[11] Patent Number: 4,935,745

[45] Date of Patent: Jun. 19, 1990

[54] CARD-TYPE RADIO RECEIVER HAVING SLOT ANTENNA INTEGRATED WITH HOUSING THEREOF

[75] Inventors: Toshihiro Mori; Kazuyuki Tsunoda, both of Tokyo; Masayoshi Yamashita, Saitama, all of Japan

[73] Assignee: NEC Corporation, Japan

[21] Appl. No.: 363,348

[22] Filed: Jun. 6, 1989

Related U.S. Application Data

[63] Continuation of Ser. No. 135,347, Dec. 21, 1987, abandoned.

[30] Foreign Application Priority Data

Dec. 19, 1986 [JP] Japan ........ 61-303398

[51] Int. Cl.[5] ........ H01Q 1/24; H04B 1/38

[52] U.S. Cl. ........ 343/702; 343/767; 455/89; 455/90

[58] Field of Search ........ 343/700 MS, 702, 718, 343/746, 767, 768; 455/89, 90, 347, 351

[56] References Cited

U.S. PATENT DOCUMENTS

| | | | |
|---|---|---|---|
| 4,625,212 | 11/1986 | Oda et al. | 343/702 |
| 4,641,366 | 2/1987 | Yokoyama et al. | 455/89 |
| 4,651,312 | 3/1987 | Honma et al. | 343/702 |
| 4,701,763 | 10/1987 | Yamamoto et al. | 343/702 |
| 4,721,962 | 1/1988 | Gorzel | 343/702 |

FOREIGN PATENT DOCUMENTS

| | | | |
|---|---|---|---|
| 0246026 | 11/1987 | European Pat. Off. . | |
| 0007204 | 1/1985 | Japan | 343/702 |
| 0245321 | 12/1985 | Japan | 455/351 |
| 0023423 | 1/1986 | Japan | 455/89 |
| 0277803 | 12/1987 | Japan . | |

*Primary Examiner*—Rolf Hille
*Assistant Examiner*—Doris J. Johnson
*Attorney, Agent, or Firm*—Laff, Whitesel, Conte & Saret

[57] ABSTRACT

A slot antenna is integrated with and forms part of the housing for a miniature radio receiver having dimensions comparable to the dimensions of a credit card. The antenna is formed by three plates arranged to have a generally U-shaped cross section. One plate is on one side of and is approximately the dimensions of the "credit card" receiver. A second plate is much more narrow and extends along one edge of the other side of the "credit card" receiver in a spaced parallel relationship with the first plate. The third plate extends vertically between the first two plates and along the one edge of the "credit card" receiver. Together, the three plates make up not only the antenna, but also three sides of the housing of the receiver.

22 Claims, 4 Drawing Sheets

CARD-TYPE RADIO RECEIVER HAVING SLOT ANTENNA INTEGRATED WITH HOUSING THEREOF

This application is a continuation of application Ser. No. 07/135,347, filed 12/21/87 now abandoned.

BACKGROUND OF THE INVENTION

The present invention relates to a miniature radio receiver and, more particularly, to a miniature radio receiver having an antenna which is integrated with the housing thereof.

An antenna of the type constituting a part of the housing of a radio receiver is disclosed in, for example, U.S. Pat. No. 3,736,591 to Rennels et al, issued May 29, 1973. The antenna disclosed in this patent is constructed to serve as a loop antenna. The radiation principle of a loop antenna is as follows (the radiation principle is reversible for reception).

The electric field extending from a loop antenna to a location which is remote from the antenna by a given distance is defined by the combination of two different electric fields. One field is derived from a difference in phase between radiation currents flowing through two conductive arms of a U-shaped member. The other field is derived from a radiation current flowing through a conductive connecting portion of the U-shaped member. Hence, as the length of the connecting portion is reduced, i.e., as the thickness of the housing is reduced, the radiation currents through the two arms approach opposite phases with respect to each other. At the same time, the radiation current through the connecting portion is reduced, thus preventing a desired antenna gain from being attained. For this reason, the receiver structure shown and described in the above patent is not applicable to a receiver having a thickness which is less than 5 millimeters, i.e. a so-called card-type of receiver.

Japanese Laid-Open Patent Publication (Kokai) No. 57-103406/1982 (published June 28, 1982) teaches a portable radio apparatus in which a conductive plate is provided on the outer periphery of the housing to serve as a slit or slot antenna. A problem with this kind of radio apparatus is that the slot antenna mounted on the other periphery of the apparatus prevents the apparatus from being reduced in thickness.

SUMMARY OF THE INVENTION

It is, therefore, an object of the present invention to provide a miniature radio receiver having an antenna which is feasible for a thin receiver configuration.

It is another object of the present invention to provide a miniature radio receiver having a slot or slit antenna which is integrated with the housing thereof.

It is still another object of the present invention to provide a miniature radio receiver which allows only a minimum of decrease in loss resistance and Q to occur despite a thin design and, yet, has an efficient slit or slot antenna.

It is a further object of the present invention to provide a miniature receiver having an antenna integrated with the housing thereof, which antenna has a three-dimensional directivity.

A miniature receiver in accordance with the present invention includes a metal plate which forms a part of the housing of the receiver. A conductive plate having a width which is smaller than the width of the metal plate is located to face the metal plate. A connecting plate provides an electrical connection between the metal plate and the conductive plate. The circuit parts of the receiver are mounted on that portion of the metal plate which does not face the conductive plate. A cover made of an insulating material is fastened to the metal plate in such a manner as to cover the conductive plate and circuit parts. A radio frequency circuit is connected to the semiconductive plate, with respect to high frequencies. The metal plate, conductive plate and connecting plate cooperate to constitute a slot or slit antenna.

BRIEF DESCRIPTION OF THE DRAWINGS

The above and other objects, features and advantages of the present invention will become more apparent from the following detailed description taken with the accompanying drawings in which.

DETAILED DESCRIPTION OF THE PREFERRED EMBODIMENTS

Figure 1:
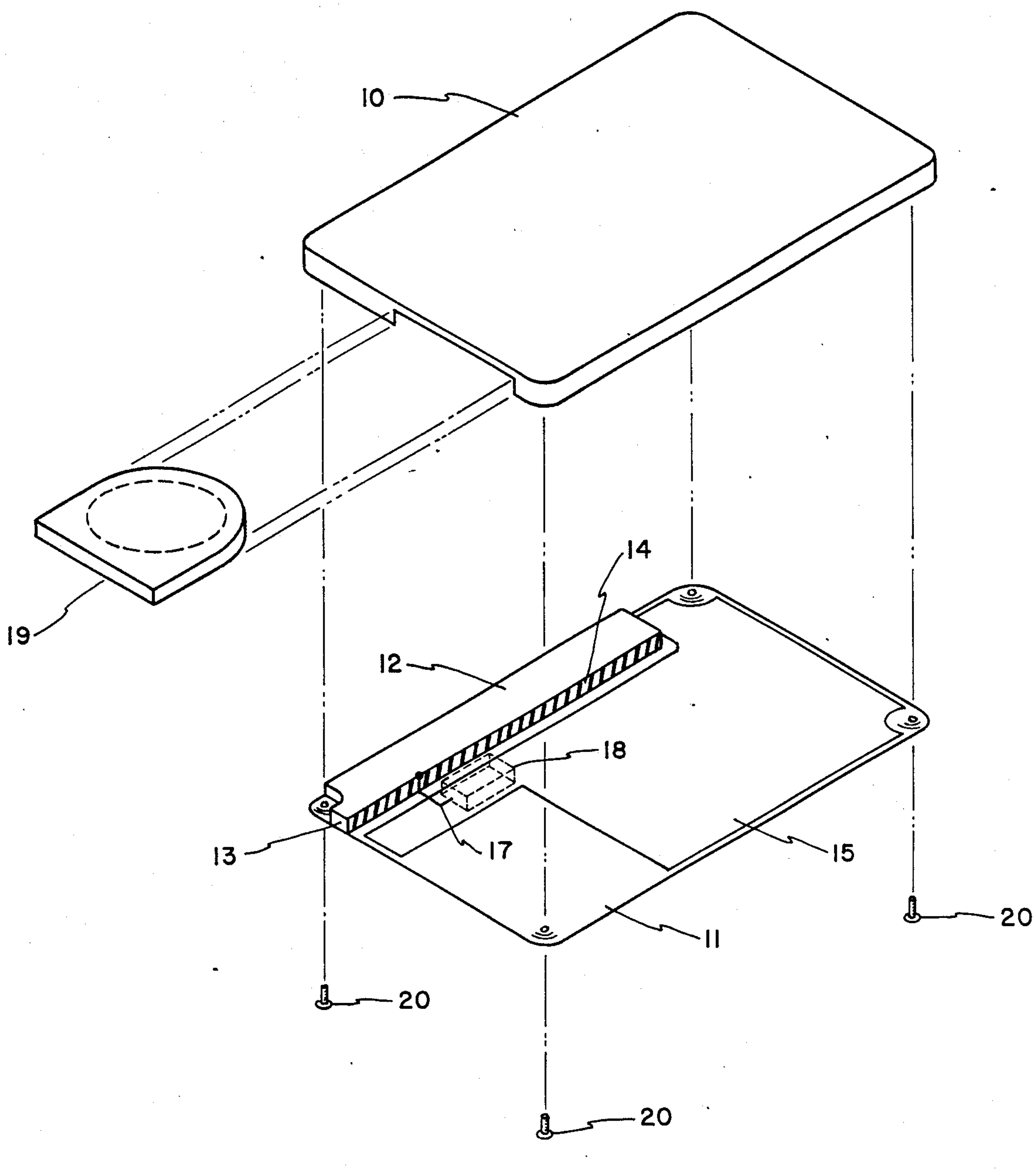
FIG. 1 is an exploded perspective view of a card-type radio receiver embodying the present invention.

Referring to FIG. 1, a radio receiver embodying the present invention includes a metal plate 11 on which a printed circuit board 15 and a conductive plate 12 are mounted. While a dressing paint or the like may be applied to the outer surface of the metal plate 11, the plate 11 itself constitutes a part of the housing of the receiver. Provided on the printed circuit board 15 are those circuits, not shown, which are necessary for paging. The printed circuit board 15 is located so as not to overlap that area in which the metal plate 11 and the conductive plate 12 face each other. A dielectric 14 having a small loss is interposed between the conductive plate 12 and the metal plate 11. As shown in the figure, the conductive plate 12 has a width which is smaller than the width of the metal plate 11.

One end of the conductive plate 12 is mechanically and electrically connected to the metal plate 11 by a conductive connecting plate 13. In this configuration, the metal plate 11, conductive plate 12 and connecting plate 13 cooperate to form a substantially U-shaped slot or slit antenna. To finely tune the slot antenna to a desired frequency, a capacitor is connected between the other end of the conductive plate 12 and ground, as later described in detail.

A radio signal picked up by the antenna is fed to a high frequency amplifier section 18 through a feeder 17. The output of the amplifier section 18 is applied to the following circuit (not shown).

A cover 10 made of an insulating material has a volume which is great enough to accommodate various elements which are mounted on the metal plate 11. The cover 10 is fastened to the metal plate 11 with screws 20. The reference numeral 19 designates a battery case which may be inserted through a side wall of the cover 10. Although not shown in the figure, the cover 10 is provided with apertures extending through the side walls for mounting a speaker grill, light-emitting diodes (LEDs), switches and other similar items.

Figure 2E:
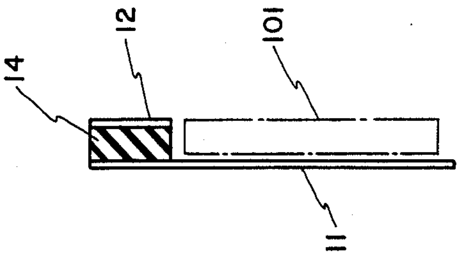
FIGS. 2A to 2E are views, each showing the antenna of FIG. 1 as viewed in a different direction.
Figure 2C:
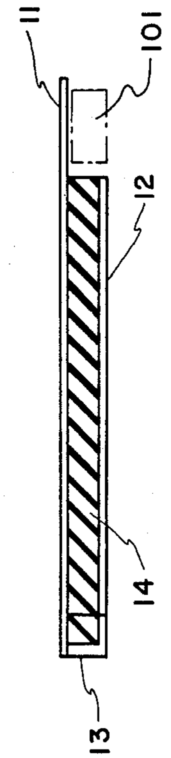
Figure 2A:
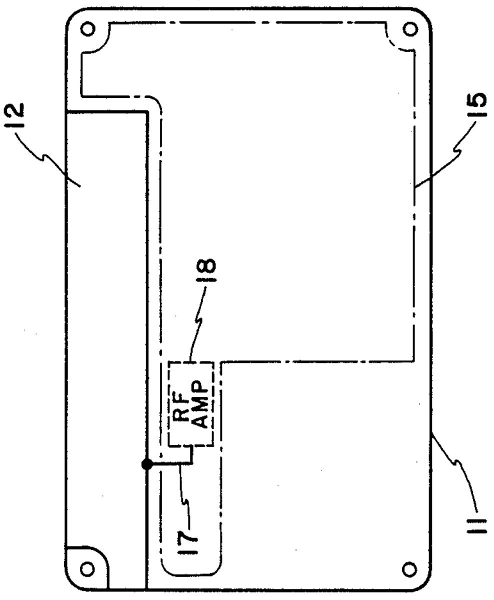
Figure 2B:
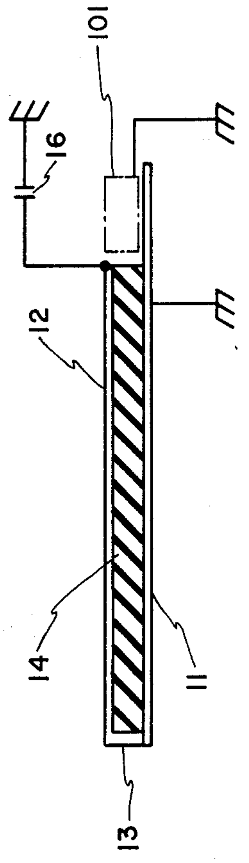
Figure 2D:
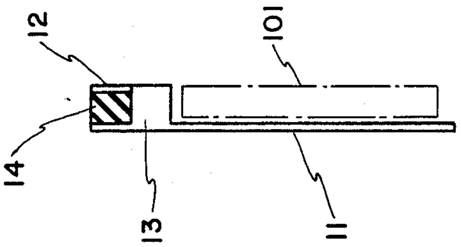

FIG. 2A shows a plan view of the radio receiver from which the cover 10 and battery case 19 are removed, for clarity. FIGS. 2B to 2E also shown the radio receiver as viewed in four different directions, respectively. As schematically shown in FIG. 2B, one end of the conductive plate 12 is connected to a common potential or ground via a capacitor 16. Also connected to the common potential are the metal plate 11 and a circuit 101 which is provided on the printed circuit board 15. The slot antenna constituted by the conductive plate 12, connecting plate 13 and metal plate 11 is tuned to a desired frequency by adequately selecting the capacitance of capacitor 16 and the connection point (feed point) of feeder 17 to the conductive plate 12.

Figure 3A:
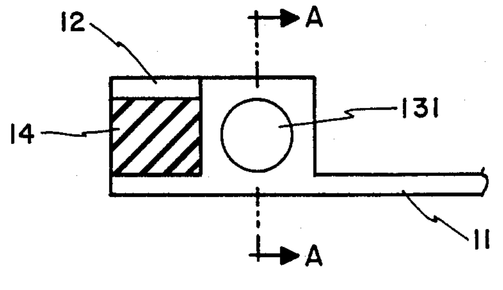
FIGS. 3A and 3B are fragmentary views showing another specific construction of a connecting plate of the receiver as shown in FIGS. 2A to 2E.
Figure 3B:
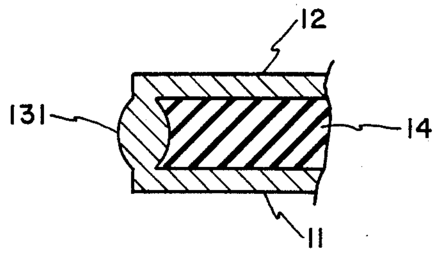

Referring to FIG. 3A, another specific configuration of the connecting plate 13 is shown. FIG. 3B is a section taken along line A—A of FIG. 3A. While the connecting plate 13 of FIGS. 1 and 2 is formed flat, a connecting plate 131 of FIGS. 3A and 3B bulges in its thicknesswise direction. Although the bulge shown in FIG. 3A is shown as an arcuate pigment, it may also be oblong depending upon the configuration of the connecting plate 131. The bulged connecting plate 131 and the dielectric 14 provide mechanical strength for preventing the conductive plate 12 from being deformed. This mechanical strength protects the conductive plate 12 against deformation even when an unexpected force is inadvertently applied to the housing of, for example, a paging receiver which is used in close contact with the human body. Further, the dielectric 14 is selected from along those materials which have low dielectric constants, i.e., small dielectric losses, so that the resonance frequency may not be noticeably changed despite some possible deformation of the conductive plate 12 and/or the connecting plate 13 or 131.

Figure 4A:
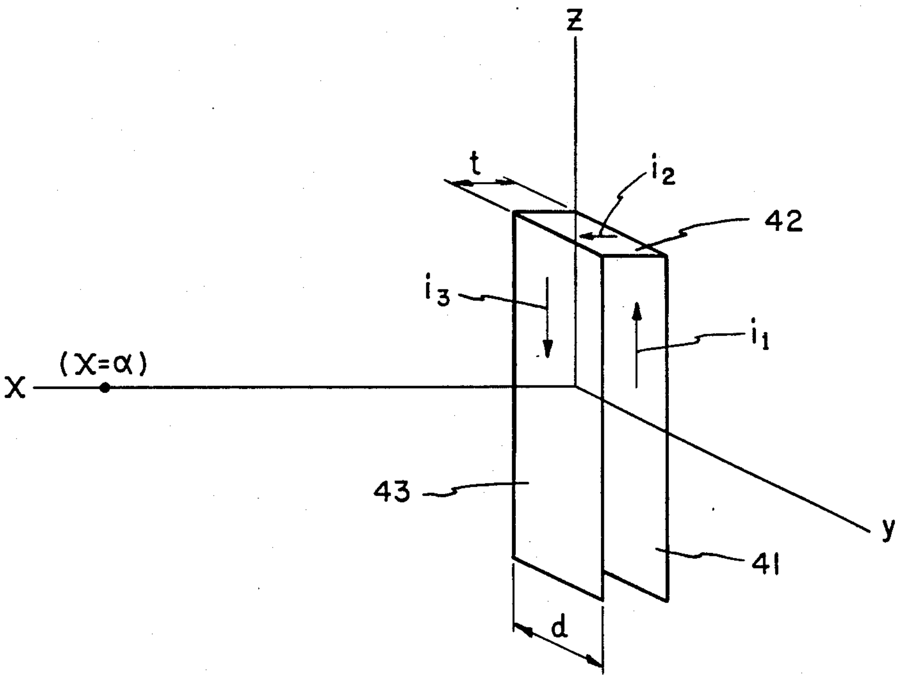
FIG. 4A PRIOR ART
FIGS. 4A and 4B are schematic views which are useful for explaining the present invention.
Figure 4B:
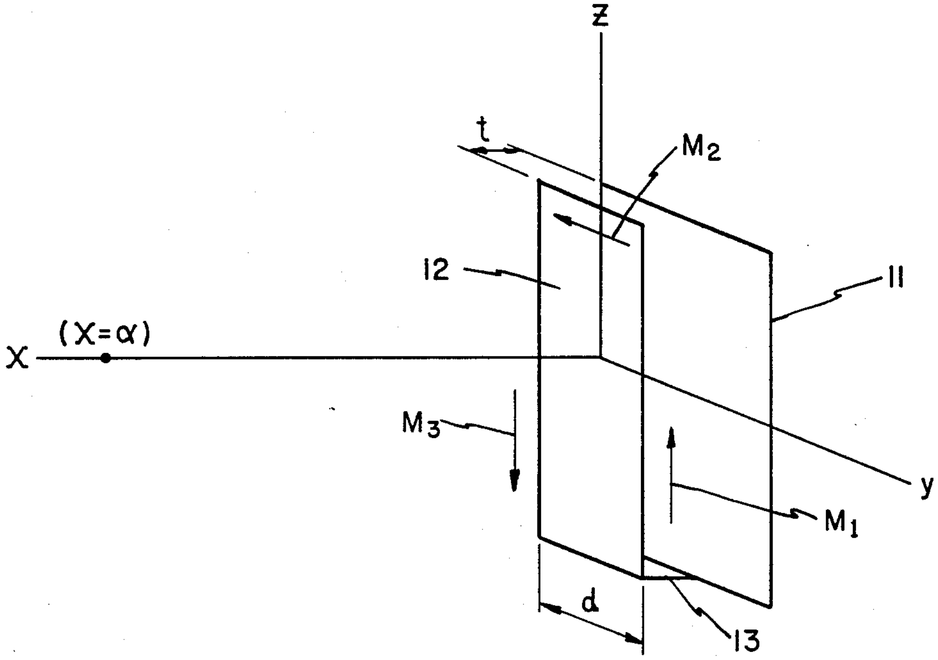

FIGS. 4A and 4B are schematic views which are useful for explaining why the slot antenna, in accordance with the present invention, is feasible for a thin radio apparatus. FIG. 4A shows a radio receiver having a housing which is partly constructed by a U-shaped loop antenna as disclosed in previously mentioned U.S. Pat. No. 3,736,591. The radiation principle of the loop antenna which is constituted by conductive plates 41 to 43 is based on the electromagnetic fields which are defined by radiation currents $i_1$, $i_2$ and $i_3$ shown in FIG. 4A (the radiation principle is reversible for reception).

Specifically, in FIG. 4A, the electromagnetic field at a location x ($=\alpha$) is obtained by the combination of the electromagnetic field due to the phase difference between the radiation currents $i_1$ and $i_3$ and the field due to the radiation current $i_2$. Hence, as the thickness t of the conductive plate 42 is reduced, the currents $i_1$ and $i_3$ approach opposite phases. At the same time, the current $i_2$ is reduced. Therefore, a decreasing of the thickness t beyond a certain value would noticeably lower the antenna efficiency to make it impossible to achieve a desired antenna gain. This is why a loop antenna having the above construction is unfeasible for a thin radio receiver.

On the other hand, the radiation principle of the slot antenna, in accordance with the present invention, is shown in FIG. 4B and is derived from the magnetic fields as defined by magnetic current sources $M_1$, $M_2$ and $M_3$. Specifically, it is only the magnetic field due to the magnetic current source $M_2$ that reaches the location $x=\alpha$ because those fields which are defined by the magnetic current sources $M_1$ and $M_3$ which are opposite in phase cancel each other. Therefore, a decrease in thickness t does not affect the substantial antenna efficiency, whereby a desired antenna gain is achievable. For this reason, the antenna of FIG. 4B is optimum when it comes to a thin radio receiver.

In FIGS. 4A and 4B, assume that the antenna width d is 5 millimeters. The thickness t which is necessary for obtaining an operation gain of $-23$ dBd at the frequency of 152.24 megahertz is 9.3 millimeters for the loop antenna, FIG. 4A, while thickness t is only 2.5 millimeters for the slot antenna, FIG. 4B. This proves that the slot antenna is advantageous over the loop antenna in respect of a thin radio receiver. The antenna width d is assumed to be 5 millimeters because the housing of a thin radio receiver has a lateral width of approximately 50 millimeters. Considering the installation of circuitry in the housing, approximately 10 percent of such a lateral dimension is reasonable.

The loop antenna taught by U.S. Pat. No. 3,736,591, like the slot antenna of the present invention, is assumed to be 5 millimeter wide and not loaded with parts thereinside because it is impossible to compare the loop antenna with the slot antenna, with the loop antenna designed as shown and described. Specifically, if the loop antenna is equal in dimension to the lateral width of the receiver housing, circuit elements installed in the antenna would lower the antenna gain.

In this connection, a radio receiver including a slot antenna with which the operation gain of $-23$ dBd is achieved in the frequency band of 150 megahertz is dimensioned approximately as follows: The metal plate 11 is 83.0 millimeter long and 52.0 millimeter wide; the conductive plate 12 is 79.0 millimeter long and 5.0 millimeter wide, and the connecting plate 13 is 4.4 millimeter high.

In the slot antenna constructed in accordance with the present invention, radio circuitry is mounted on the part of the metal plate 11 which does not face the conductive plate 12. The conductive plate constitutes a cavity resonator, while no circuit element is installed in the resonator. This construction causes a minimum increase in loss resistance to occur and, thereby, suppresses any decrease in Q value and antenna efficiency by a significant degree. Since the conductive plate 12 is located at the end of and parallel to the metal plate 11 and since the conductive plate 12 is narrower than the metal plate 11, a three-dimensional directivity is guaranteed, due to the decrease in the directivity gain of a main polarized signal component as well as to the increase in the directivity gain of a cross-polarized signal component.

Figure 5A:
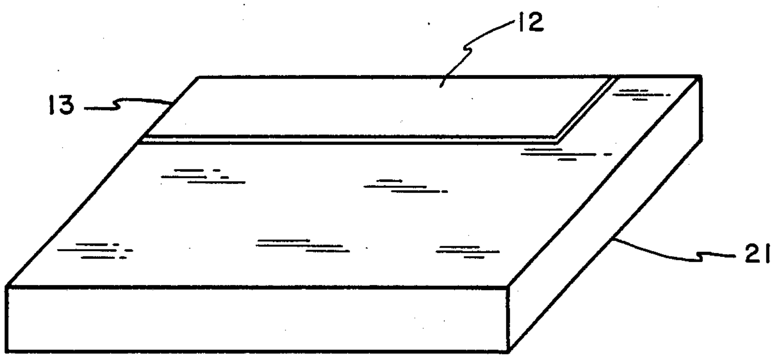
FIGS. 5A to 5C are three views, each showing another embodiment of the present invention.
Figure 5B:
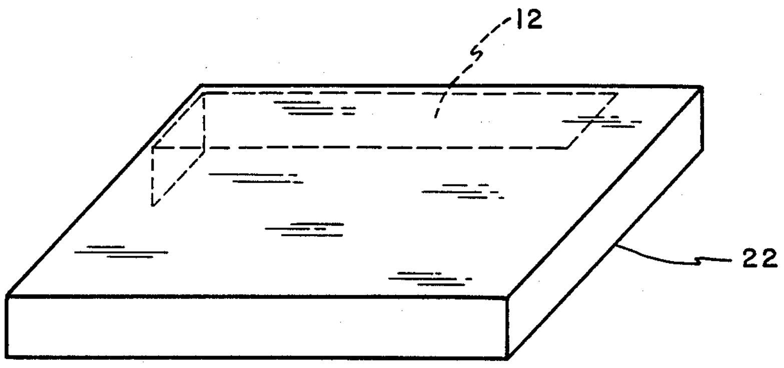
Figure 5C:
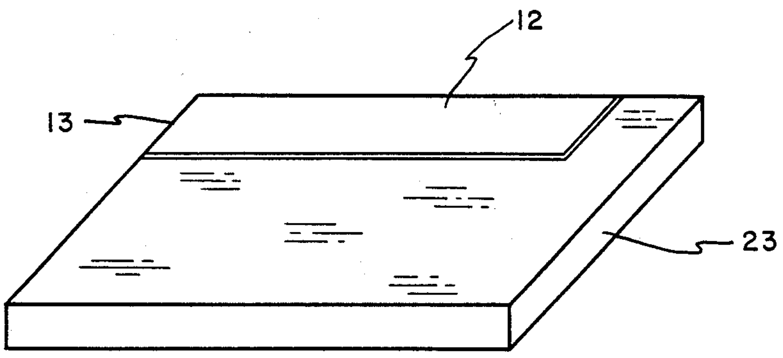

Each of the FIGS. 5A to 5C shows another embodiment of the present invention. In FIG. 5A, the conductive plate 12 and the connecting plate 13 are exposed to the outside while the metal plate 11 is concealed by an extremely thin cover 21 which is made of synthetic resin. In FIG. 5B, the slot antenna (metal plate, conductive plate and connecting plate) is fully enclosed by an extremely thin cover 22 which is also made of synthetic resin. Further, in FIG. 5C, all of the metal plate, conductive plate 12 and connecting plate 13 which constitute the slot antenna are exposed to the outside, the other part 11 being concealed by only a cover 23, which is made of resin. While it is obvious that the configuration shown in FIG. 5C is the thinnest, it will not feel so pleasant to the user because the metal is exposed.

What is claimed is:

1. A miniature radio receiver comprising:

a metal plane plate for forming a part of a slot antenna and for constituting a part of a housing of said receiver;

a conductive plate facing one surface of said metal plate and having a width which is smaller than the width of said metal plane plate;

a connecting plate electrically connecting one end of said conductive plate and one end of said metal plane plate;

circuit components mounted on said surface of said metal plane plate, which does not face said conductive plate;

a cover made of an insulating material and fixed to said metal plane plate for covering said circuit components; and a radio frequency circuit coupled to said conductive plate, whereby said metal plane plate, said conductive plate, and said connecting plate together constitute a slot antenna.

2. A miniature radio receiver as claimed in claim 1, further comprising a dielectric interposed between said conductive plate and said first metal plate and having a small dielectric constant.

3. A miniature radio receiver as claimed in claim 1, wherein said connecting plate includes a portion which bulges in a thicknesswise direction.

4. A miniature radio receiver as claimed in claim 1, further comprising a capacitor which is connected to one end of said conductive plate which is opposite to said one end to which said connecting plate is connected, said capacitor being used for adjusting the operation frequency of said slot antenna.

5. A miniature radio receiver as claimed in claim 1, wherein said cover is fixed to said metal plane plate by screws.

6. A miniature radio receiver as claimed in claim 1, further comprising a dressing paint which is applied to an outer surface of said metal plane plate.

7. A miniature radio receiver as claimed in claim 1, further comprising an extremely thin cover made of synthetic resin which encloses said metal plane plate.

8. A slot antenna for use in miniature radio receiver, said slot antenna comprising:

a metal plane plate for forming a part of a slot antenna and for constituting a part of a housing of said receiver;

a conductive plate facing one surface of said metal plane plate and having a width which is smaller than the width of said metal plane plate, said metal plane plate carrying circuit components on that portion of said surface which does not face said conductive plate; and a connecting plate electrically connecting one end of said metal plane plate and one end of said conductive plate.

9. The slot antenna as claimed in claim 8, further comprising a dielectric which is interposed between said conductive plate and said metal plane plate.

10. The slot antenna as claimed in claim 9, wherein said dielectric has a relatively small dielectric constant.

11. The slot antenna as claimed in claim 8, wherein said connecting plate includes a portion which bulges in a thickness direction.

12. The slot antenna as claimed in claim 8, further comprising a capacitor which is connected to one end of said conductive plate which is opposite to said one end to which said connecting plate is connected, said capacitor being used for adjusting the operation frequency of said slot antenna.

13. The slot antenna as claimed in claim 8, further comprising a paint which is applied to the outer surface of said part of said slot antenna which constitutes part of said housing.

14. The slot antenna as claimed in claim 8, wherein said circuit components comprise a radio frequency circuit which is connected to said conductive plate.

15. A miniature radio receiver comprising:

a metal plane plate for forming a part of a slot antenna and for constituting a part of a housing of said receiver;

a conductive plate facing one surface of said metal plane plate and having a width which is smaller than the width of said metal plane plate;

a connecting plate for electrically connecting one end of said metal plane plate and one end of said conductive plate;

means for connecting the other end of said metal plane plate to ground;

a radio frequency circuit mounted on said surface of said metal plane plate, which does not face said conductive plate; and means for feeding a radio signal from said conductive plate to said radio frequency circuit.

16. A miniature radio receiver as claimed in claim 15, further comprising a dielectric having a small dielectric constant which is interposed between said metal plane plate and said conductive plate.

17. A miniature radio receiver as claimed in claim 15, wherein said connecting plate is designed to maintain the mechanical strength of said conductive plate.

18. A miniature radio receiver comprising:

a metal plane plate for forming a part of a slot antenna and for constituting part of a housing of said receiver;

a conductive plate facing one surface of said metal plane plate, constituting another part of said housing, and extending in a spaced parallel relationship to an end of said metal plane plate, said conductive plate having a width which is smaller than the width of said metal plane plate;

a connecting plate electrically connecting one end of said metal plane plate and one end of said conductive plate;

circuit components mounted on part of said surface in said metal plane plate which does not face said conductive plate;

a radio frequency circuit connected to said conductive plate with respect to a high frequency; and a cover made of an insulating material which is fixed to said metal plane plate while covering said circuit components.

19. A method of mounting an antenna on a thin miniature receiver, comprising the steps of:

forming a metal plane plate which forms a part of a slot antenna and constitutes a part of a housing of said receiver;

locating above said metal plate a conductive plate which faces one surface of said metal plate and which has a width which is smaller than the width of said metal plane plate;

electrically connecting one end of said conductive plate and one end of said metal plate;

mounting a circuit part of said receiver on said surface in said metal plane plate, which does not face said conductive plate; and connecting a radio frequency circuit to said conductive plate.

20. A method as claimed in claim 19, further comprising the step of interposing a dielectric having a small dielectric constant between said conductive plate and said metal plane plate.

21. A method as claimed in claim 19, further comprising the step of providing in said connecting plate a portion which bulges in a thickness direction of said connecting plate.

22. A method as claimed in claim 19, further comprising the step of connecting a capacitor to the other end of said conductive plate to which said connecting plate is not connected, said capacitor being used for tuning the operation frequency of said antenna.

* * * * *